United States Patent [19]

Bubnick et al.

[11] 4,048,389
[45] Sept. 13, 1977

[54] CATHODE OR CATHODE COLLECTOR ARCUATE BODIES FOR USE IN VARIOUS CELL SYSTEMS

[75] Inventors: Gerald Frank Bubnick, Cleveland; Lewis Frederick Urry, Columbia Station, both of Ohio

[73] Assignee: Union Carbide Corporation, New York, N.Y.

[21] Appl. No.: 659,125

[22] Filed: Feb. 18, 1976

[51] Int. Cl.² .......................................... H01M 6/14
[52] U.S. Cl. ................................. 429/101; 429/105; 429/194; 429/164
[58] Field of Search ............... 136/13, 14, 107, 6 F, 136/134 R, 69; 429/101, 105, 106–109, 122, 164, 167, 194–199

[56] References Cited

U.S. PATENT DOCUMENTS

| 3,156,585 | 11/1964 | Yamano et al. | 136/14 X |
| 3,245,837 | 4/1966 | Ikeda et al. | 136/24 X |
| 3,734,778 | 5/1973 | Huf et al. | 136/13 |
| 3,796,606 | 3/1974 | Lehmann et al. | 136/13 |

Primary Examiner—Anthony Skapars
Attorney, Agent, or Firm—Cornelius F. O'Brien

[57] ABSTRACT

The invention relates to a cylindrical type cell employing an outer active metal anode, a separator and an inner disposed cathode or cathode collector in the form of at least two arcuate bodies, said cathode or cathode collector having outward resilient biasing means for providing continuous physical contact between the anode-separator-cathode or cathode collector interfaces.

10 Claims, 13 Drawing Figures

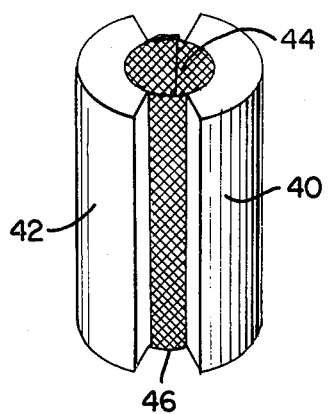
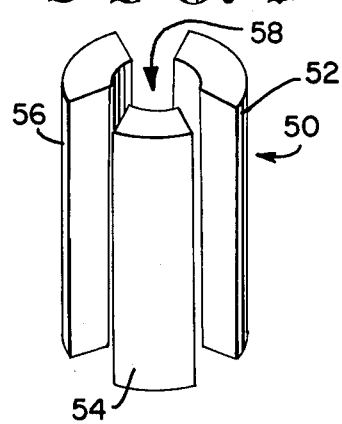
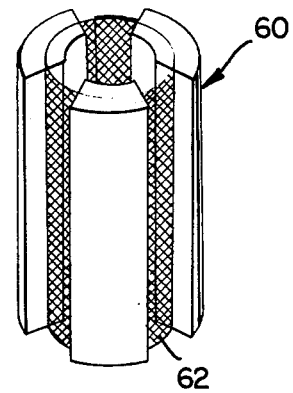
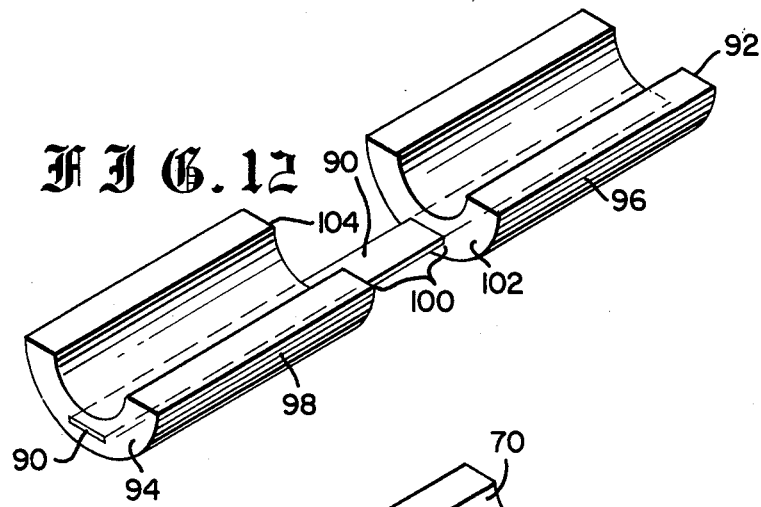
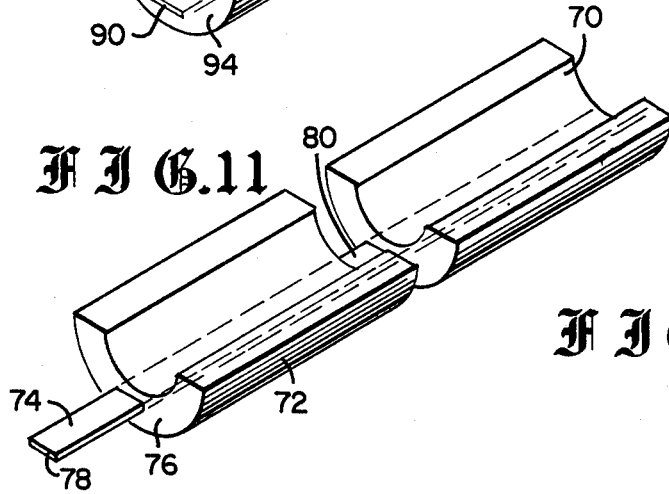
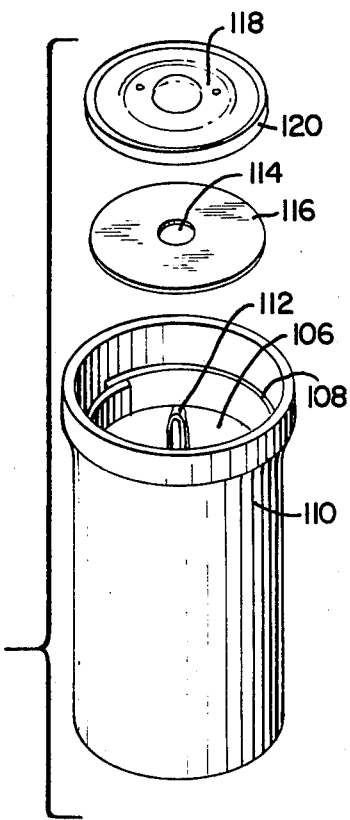

CATHODE OR CATHODE COLLECTOR ARCUATE BODIES FOR USE IN VARIOUS CELL SYSTEMS

FIELD OF THE INVENTION

The invention relates to a cylindrical type cell employing an outer disposed anode, a separator and an inner disposed cathode or cathode collector which is in the form of at least two arcuate bodies, said arcuate bodies being axially disposed within the cell with resilient biasing means centrally located so as to continuously force the arcuate bodies radially outward to form a good physical contact against the separator which in turn contacts the anode of the cell thereby maintaining a low internal resistance in the cell during discharge.

BACKGROUND OF THE INVENTION

The continuing development of portable electrically powered devices such as tape recorders and playback machines, radio transmitters and receivers, and the like, creates a continuing demand for the development of reliable, long service life cells or batteries for their operation. Recently developed electrochemical cell systems that will provide a long service life utilize highly reactive anode materials such as lithium, sodium, and the like, in conjunction with high energy density liquid cathode materials and nonaqueous electrolytes. However, the conventional cylindrical cell structures are not ideally suited for the components of these high energy cell systems. For example, in a cylindrical cell, if the anode is disposed in contact with the inner surface of the cell casing and spaced apart a fixed distance from a centrally located cathode or cathode collector by a conventional separator member, then although good contact can be provided between these components when they are assembled in the cell, the contact between these components will decrease as the anode dissolves during discharge. Consequently, the dissolving of the anode during discharge will decrease the volume of the anode and thus tend to increase the distance between anode, separator and cathode or cathode collector thereby increasing the length of the electrolyte path between these components which will result in an increase of the internal resistance in the cell.

To overcome the above disadvantage when using the components of such high energy density cell systems, it has been proposed that the components be assembled in rolled or coiled electrode assemblies (jelly roll construction) which would ensure good contact between the components of the cell during discharge. This type of cell construction is disclosed in U.S. Pat. No. 3,809,580. Although the jelly roll construction is suitable for liquid and solid cathode cell systems, jelly roll cells are rather expensive to make and time consuming to fabricate and assemble.

U.S. Pat. No. 3,796,606 discloses a cylindrical electrochemical cell whose positive electrode is in contact with the outer casing of the cell and separated by a porous separator from a negative electrode constituted by a sheet of metal having a very negative standard oxidation potential surrounding an elastically deformable current collector having a split cylindrical shape. The elasticity of the current collector enables it to maintain biased contact with the negative electrode at all times notwithstanding alteration in electrode volumes during discharge of the cell and thus to maintain the reacting surfaces of the solid positive and negative electrodes at optimum distances by continuously biasing the negative electrode against the porous separator.

It is an object of this invention to provide a cylindrical type cell employing an active metal anode in conjunction with an inner disposed cathode or cathode collector in the form of at least two arcuate bodies.

It is another object of the present invention to provide an electrochemical cell employing a liquid or solid active cathode material in conjunction with an active metal anode and a carbonaceous cathode collector in the form of at least two arcuate bodies.

It is another object of the present invention to provide a nonaqueous cylindrical cell employing a carbonaceous cathode collector in the form of at least two arcuate bodies having resilient biasing means disposed axially within the space defined by said bodies so as to force the bodies radially outward thereby maintaining the anode, separator and current collector of the cell in physical and ionic contact.

It is another object of the present invention to provide a cylindrical type cell employing an active metal anode in conjunction with an inner disposed cathode or cathode collector in the form of at least two arcuate bodies having resilient biasing means embedded with said arcuate bodies so that when said arcuate bodies are orientated to form a cylindrical type structure and then disposed axially within the cylindrical cell, the biasing means will exert a radially outward force so as to maintain the anode, separator and cathode of the cell in continuous physical and ionic contact.

It is another object of the present invention to provide a nonaqueous cylindrical cell having component parts easy to assemble and which will exhibit a relatively low internal cell resistance during discharge.

The foregoing and additional objects will become more fully apparent from the following description and the accompanying drawings.

SUMMARY OF THE INVENTION

The invention relates to an electrochemical cell comprising a container (or can); an anode disposed within said container; a porous separator disposed within and in surface contact with said anode; a cathode or cathode collector in the form of at least two arcuate bodies disposed within said separator; means for resiliently biasing said arcuate bodies radially outward against said separator which in turn contacts the anode; and an electrolyte disposed within said container. More specifically, the electrochemical cell can comprise an electrically conductive container closed at one end and open at the other end; an anode disposed within and in surface contact with said container thereby adapting said container as a first terminal for the cell; a porous separator disposed within and in surface contact with said anode; a cathode or cathode collector in the form of at least two arcuate bodies disposed within said separator; means for resiliently biasing said arcuate bodies radially outward in surface contact with said separator which in turn contacts said anode thereby effectively maintaining physical and ionic contact between the cathode or cathode collector, separator and anode interfaces during discharge of the cell; an electrolyte disposed within and in contact with said cathode or cathode collector and anode; a cover for said container; an insulating member interposed between said cover and the top inner wall of said container such that a seal is formed between said cover and said container; and said cathode or cathode collector and said cover being electrically interconnected so as to adapt said cover as the second terminal of the cell. If desired, the cells container could be made of a plastic tube with metal bottom and top closures and an inner metal liner, said metal liner being employed to provide contact with the anode and the bottom metal closure.

As used herein and as described in an article titled "Electrochemical Reactions in Batteries" by Akiya Kozawa and R. A Powers in the Journal of Chemical Eduction — Vol. 49, pages 587 to 591, September 1972 issue, a cathode (positive electrode) is a reactant material and, therefore, is the material electrochemically reduced on discharge of the cell. A cathode collector is not an active reducible or oxidizable material and functions as a current collector (electronic conductor) for the cathode of a cell.

As used herein, an arcuate body shall mean an arc segment of a generally cylindrical tube or ring preferably ranging from about 90° arc segment to below about a 180° arc segment depending on the number of arc segments employed in the cell. For example, when two arc segments are used, then each could range from about a 140° arc segment to below about a 180° arc segment while when employing three arc segments, then each could range from about a 90° arc segment to below about a 120° arc segment. As used herein, a generally cylindrical spring member shall mean a coiled spring having one or more turns or an arcuate spring segment of less than 360°.

In one embodiment of this invention wherein the arcuate bodies form the cathode collector of the cell, the cathode collector serves to conduct current to the cell closure terminal from the positive electrode material and where it is used in conjunction with a liquid active cathode depolarizer, the cathode collector must also serve as extended area reaction sites for the cathodic electrochemical process of the cell. This latter type of cathode collector must be an electronic conductor, have porosity with preferably at least 50% interconnected voids for providing increased access to reaction sites and be of a material capable of catalyzing or sustaining the cathodic electrochemical process. Materials suitable for use as a cathode collector are carbon materials and metals, such as nickel, with acetylene black being preferable. In addition to the above characteristics, the cathode collector must be capable of being molded into various size discrete bodies that can be handled within cracking or breaking. To impart this cohesive characteristic to the cathode collector, a suitable binder material, with or without plasticizers and with or without stabilizers, may be added to the cathode collector material. Suitable binder materials for this purpose may include vinyl, polyethylene, polypropylene, acrylics, styrene and the like. For example, the preferred binder for cathode collectors for use with liquid oxyhalides is polytetrafluoroethylene. The binder, if required, should be added in an amount between about 10% and about 30% by weight of the molded cathode collector since an amount less than 10% would not provide sufficient strength to the molded body while an amount larger than 30% would wetproof the surface of the carbon and/or otherwise reduce or mask part of the available surface of the carbon thereby reducing the activation site areas required for the cathodic electrochemical process of the cell. Preferably, the binder should be between 10% and 25% by weight of the cathode collector. Of importance in selecting the materials for the cathode collector is to select materials that will be chemically stable in the cell system in which they are to be used.

In another embodiment of this invention in which the arcuate bodies form the active cathode of the cell, the cathode should be sufficiently porous for penetration by the electrolyte of the cell. As stated above with reference to the cathode collector, the cathode must be capable of being molded into various size discrete bodies that can be handled without cracking or breaking. To impart this cohesive characteristic to the cathode, a suitable binder material, with or without plasticizers and with or without stabilizers, may be added to the cathode material. Suitable binder materials for this purpose may include Portland cement, or resins such as vinyl, polyethylene, polypropylene, acrylics, styrene and the like with polytetrafluoroethylene being the preferred. In some cell systems, the active cathode material can be mixed with carbon and/or graphite material along with the binder. For example, molded manganese dioxide electrodes are generally composed of particulate manganese dioxide mixed with a particulate conductive material such as carbon and/or graphite and a suitable binder as recited above. The binder when used in molded cathodes for use in this invention can vary between about 3% and about 20% by weight of the molded cathode, preferably the binder could be added in an amount between about 4% and 7% by weight of the cathode.

A conductive spring member made of a material such as nickel, stainless steel, or Inconel (a trademark for a corrosion-resisting alloy containing 76% Ni, 15% Cr and 9% Fe) could be employed as the electrically conductive means for electrically connecting the cathode or cathode collector to the cover of the cell so as to adapt the cover as the positive terminal of the cell while also functioning as the resilient biasing means for mechanically forcing the cathode or cathode collector radially outward against the separator in the cell. This could be accomplished, for example, by using a conductive "U" shaped or coiled spring member which can be squeezed and inserted into an axial opening defined by the arcuate bodies of this invention whereupon the expansion of the spring member within the axial opening will provide good electrical pressure contact to the arcuate bodies while also biasing said bodies against the separator which in turn contacts the anode of the cell. An extended end or leg of the "U" shaped spring member, if conductive, could be secured in a conventional manner to the cover of the cell thereby adapting the cover as the positive terminal of the cell. In another embodiment, a separate conductive strip, such as a nickel strip, could be secured at one end to the "U" shaped or coiled spring member and at its other end to the cover of the cell so as to adapt the cover as the positive terminal of the cell.

The cathode and cathode collector bodies of this invention could also be made with a stable spring member, preferably in the form of an arcuate member or a cylindrically coiled screen, embedded within the bodies so as to add strength to the bodies in addition to providing the bodies with biasing means in accordance with the teachings of this invention.

The biasing means suitable for use in this invention could be any spring means which will exert a mechanical bias against the cathode or cathode collector bodies when assembled in a cell so as to provide good physical contact between said bodies and the separator, between the separator and the anode, and between the anode and container of the cell thereby maintaining a low internal cell resistance during discharge of the cell.

The cell made in accordance with this invention will employ preformed arcuate bodies having one or more of the following advantages:

1. The cathode collector or cathode and spring member assembly will provide a mechanical bias against the separator and in turn the anode of the cell thereby maintaining a low internal resistance in the cell during discharge while the anode is being consumed.

2. The axial opening defined within the arcuate bodies will provide a reservoir for the electrolyte of the cell which will enable rapid diffusion of the electrolyte to the anode/cathode reaction interface.

3. In liquid cathode cell systems the porous cathode collector arcuate bodies will permit an in-depth electrochemical reduction of the liquid cathode depolarizer within the porous arcuate bodies.

In liquid cathode cell systems the liquid active reducible cathode materials usually are mixed with a conductive solute which is a non-reactive material and which is added to improve conductivity of the liquid active reducible cathode materials, or the liquid cathode materials can be mixed with both a conductive solute and an electrochemically reactive or non-reactive cosolvent material. When an electrolyte solvent performs the dual function of acting as solvent for an electrolyte salt and as the active cathode material of the cell, then the solution is referred to as a "cathode-electrolyte". In assembling the cell, a liquid cathode could be placed into the axial cavity defined by the cathode collector where it would permeate through the cathode collector bodies and through the separator to contact the anode of the cell. Thus the cavity defined by the arcuate bodies of the cathode collector could be used as a reservoir for the cathode-electrolyte.

Suitable nonaqueous liquid cathode materials for use in this invention could be one or more of the liquid oxyhalides of an element of Group V or Group VI of the Periodic Table and/or one or more of the halides of an element of Group IV to Group VI of the Periodic Table, said Periodic Table being the Periodic Table of Elements as set forth on the inside back cover of the Handbook of Chemistry and Physics, 48th Edition, The Chemical Rubber Co., Cleveland, Ohio, 1967-1968. For example, such non-aqueous cathode materials would include sulfuryl chloride, thionyl chloride, phosphorus oxychloride, thionyl bromide, chromyl chloride, vanadyl tribromide, selenium oxychloride, sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribromide chloride. Liquid sulfur dioxide is also a suitable cathode material.

Examples of suitable anodes for use in nonaqueous cells would include lithium, sodium, calcium, magnesium, lithium monoaluminide and lithium-magnesium alloy.

Suitable aqueous cathode materials for use in this invention include aqueous solutions of persulfate, peroxide, permanganate and chromic acid. Examples of suitable anodes for aqueous cells would include aluminum, magnesium, zinc and cadmium.

Some preferred combinations of nonaqueous cathode materials and anodes would be as follows:

(1) sulfuryl chloride/Li or Na;
(2) thionyl chloride/Li or Na;
(3) phosphorus oxychloride/Li or Na;
(4) sulfur monochloride/Li or Na;
(5) sulfur monobromide/Li or Na;
(6) selenium tetrafluoride/Li or Na.

Some preferred combinations of soluble aqueous cathode materials and solid anodes would be a zinc, magnesium or aluminum anode in an aqueous solution of persulfate or chromic acid.

In addition to the manganese dioxide solid cathode electrodes for use in Leclanche electrochemical systems, a wide variety of other solid cathode electrodes for other electrochemical systems can be used in this invention. Among the solid cathode electrode materials that are suitable for use in this invention are such materials as lead dioxide, nickel oxyhydroxide, mercuric oxide, silver oxide, inorganic metal halides such as silver chloride and lead chloride, and organic materials which are capable of being reduced such as dinitrobenzene and azodicarbonamide compounds. Among the negative electrode materials that are suitable for use in this invention are zinc-clad steel, zinc, aluminum, magnesium, lead, cadmium and iron. Suitable electrolytes are ammonium chloride and/or zinc chloride, zinc perchlorate, zinc bromide, various alkaline electrolytes such as the hydroxides of potassium, sodium and/or lithium, acidic electrolytes such as sulfuric or phosphoric acid, and nonaqueous electrolytes, said electrolytes being chosen to be compatible with the negative and positive electrodes.

The solute for use in this invention may be a simple or double salt which will produce an ionically conductive solution when dissolved in a suitable solvent. Preferred solutes for the nonaqueous systems are complexes of inorganic or organic Lewis acids and inorganic ionizable salts. The only requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226, July/December, 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

If desired in liquid cathode cell systems, a cosolvent may be added to the liquid active reducible cathode and solute solution to alter the dielectric constant, viscosity and solvent properties of the solution to achieve better conductivity. Some examples of suitable cosolvents are nitrobenzene, tetrahydrofuran, 1,3-dioxolane, 3-methyl-2- oxazolidone, propylene carbonate, γ-butyrolactone, sulfolane, ehtylene glycol sulfite, dimethyl sulfite, dimethyl sulfoxide, benzoyl chloride, dimethoxyethane, dimethyl isoxazole, diethyl carbonate, and the like.

The separator for use in this invention can be made from a wide variety of materials, such as glass, plastics, cellulose, starch, etc. It can be in the form of swellable coatings on paper, swellable films such as cellulose in aqueous solutions, woven or felted papers, perforated sheets or combinations of the foregoing.

The separator has to be chemically inert and insoluble in the cell system. It should also have a porosity of about 25 percent or more, preferably about 50 percent, so as to permit the liquid electrolyte to permeate through and contact the anode layer thus establishing an ion transfer path between the anode and cathode. Suitable separators for use in liquid cathode cell systems that will remain stable in the presence of the liquid cathode materials, for example, liquid oxyhalide cathode materials, are the non-woven glass separators, preferably those separators that incorporate long glass fibers along with the short glass fibers since such a combination increases the tear strength of the separators thereby making them easier to handle.

Suitable separators for use with aqueous systems for example are starch or methyl cellulose on felted paper, cast cellulose film, gelled wheat starch or flour pastes, felted or woven fibers of plastic such as nylon, polyethylene, etc. or porous cast vinyl sheets.

The can and cover for use in this invention can be stainless steel, iron, nickel, nickel-plated steel, plastic or some other material that will not corrode or otherwise deteriorate when in contact with the cell materials. Preferably in the case of the liquid oxyhalide cathode system, the can and cover could be made of nickel or 304 stainless steel which has been heat treated to release the inherent stresses introduced during conventional drawing operations.

The insulating member disposed between the cover and the can has to be stable in the presence of the cell components and can be selected from such materials as polytetrafluoroethylene (e.g., "Teflon"), fluorinated ethylene-propylene (e.g., FEP), ethylene copolymer with FEP (e.g., "Tefzel"), chlorotrifluoroethylene (e.g., "Kel-F"), perfluoro-alkoxy polymer (e.g., PFA), tetrafluoroethylene (TFE), polyvinyl, polyethylene, polystyrene etc. and the like.

The present invention will become apparent from the following description thereof when considered together with the accompanying drawings which are set forth as being exemplary of embodiments of the present invention and are not intended, in any way, to be limitative thereof and wherein:

FIG. 8 is a perspective view of a cylindrical coiled screen disposed within an axial opening defined by two arcuate bodies according to this invention.

FIG. 9 is a perspective view of another embodiment of a cathode or cathode collector in the form of three arcuate bodies.

FIG. 10 is a perspective view of a cylindrical screen embedded within three arcuate cathode or cathode collector bodies.

FIG. 11 is a perspective view of two half cylindrical annular cathode or cathode collector bodies having a common biasing strip embedded longitudinally within said bodies.

FIG. 12 is a perspective view similar to FIG. 11 except that the biasing strip does not protrude from the end surfaces of the two half cylindrical bodies; and FIG. 13 is a partially exploded view of a cell employing the cathode or cathode collector bodies of FIG. 12.

Figure 1:
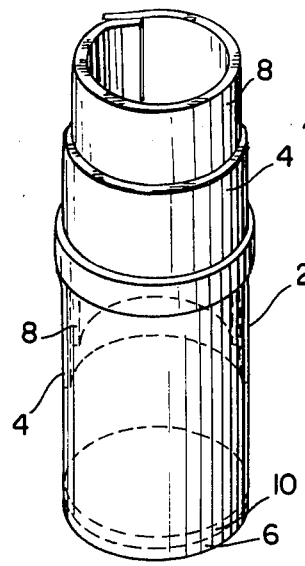
FIG. 1 is a perspective view of an anode and separator partially assembled in a cell can.

Referring in detail to FIG. 1, there is shown a cylndrical can (container) 2 having partially disposed therein an anode liner 4 in contact with the inner upstanding circumference of the can 2 and completely disposed therein an optional bottom anode disc 6, shown in broken lines, in contact with the base of the can 2 thereby adapting the container as the anodic or negative terminal for the cell. Partially disposed within and in contact with the inner circumference of anode liner 4 is a separator liner 8 while a bottom separator disc 10, also shown in broken lines, is in contact with the bottom anode disc 6. If desired, the anode material could be extruded in the container 2, rolled with the can material or placed in the container as an anode liner composed of one or more segments to form a cylindrical tube.

Figure 2:
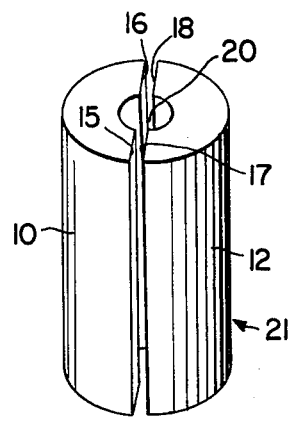
FIG. 2 is a perspective view of a cathode or cathode collector in the form of half cylindrical annular bodies.

A two member cathode or cathode collector 21 is shown in FIG. 2 comprising elongated arcuate members 10 and 12. Specifically, the first half cylindrical annular member 10 having flat end faces 15 and 16 and a second half cylindrical annular member 12 having flat end faces 17 and 18. When the flat end faces of each cylindrical half member are arranged in an opposing fashion as shown in FIG. 2, an axial opening 20 is defined between the cylindrical half annular members 10 and 12.

Figure 3:
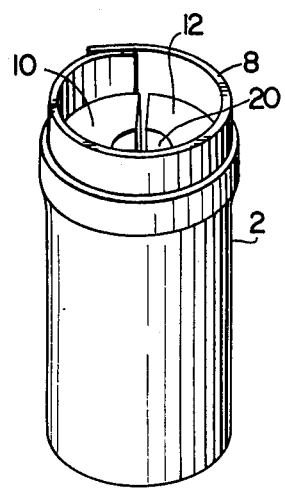
FIG. 3 is a perspective view of an anode, separator and cathode or cathode collector assembled in a cell can.
Figure 4:
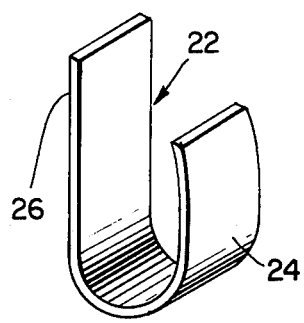
FIG. 4 is a perspective view of a conductive spring member.
Figure 5:
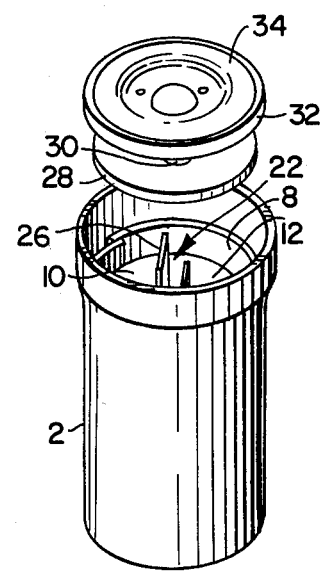
FIG. 5 is a partially exploded view of a cell employing a cathode or cathode collector in the form of two arcuate bodies according to this invention.
Figure 6:
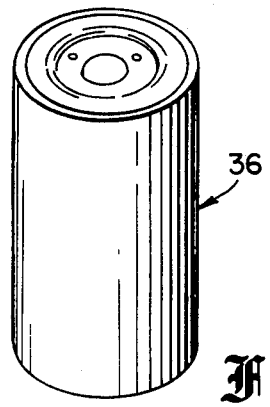
FIG. 6 is a perspective view of a completely assembled cell.

FIG. 3 shows the same numbered components of FIGS. 1 and 2 in an assembled form. FIG. 4 shows an electrically conductive spring strip 22 having a "U" shape formed of a first conductive leg segment 24 and a second longer conductive leg 26. When inserting the spring strip 22 into the container the legs of the conductive strip 24–26 are squeezed together and forced into the axial opening between the two cathode or cathode collector members arranged in a container as shown in FIG. 3. As shown in FIG. 5, with the conductive spring strip 22 inserted into the axial opening defined by the two cathode or cathode collector members 10 and 12 so as to provide a good electrical contact with said members, the extended leg 26 of spring strip 22 projects above the surface of members 10 and 12. An insulator disc 28 has a central opening 30 through which the projected leg 26 of the spring strip 22 passes, whereupon the leg 26 is then welded to cover 34 thereby adapting cover 34 as the cathodic or positive terminal of the cell. An insulating gasket or ring 32 is shown assembled with cover 34 in FIG. 5 so that when said cover-ring assembly is placed on top of the container 2 after the electrolyte has been added, insulating ring 32 will be interposed between cover 34 and container 2 whereupon conventional techniques, such as the radial-squeeze technique, can be used to seal the cell. A fully assembled cell 36 is shown in FIG. 6.

Figure 7:
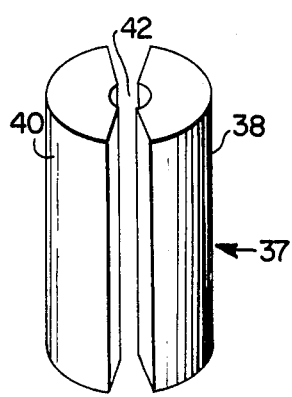
FIG. 7 is a perspective view of another embodiment of a cathode or cathode collector in the form of two arcuate bodies.

Another embodiment of a two piece cathode or cathode collector is shown in FIG. 7. Specifically, the cathode or cathode collector 37 comprises a first arcuate member 38 and a second arcuate member 40, both of which have an arc measurement of about 150°. When the longitudinal flat end faces of each arcuate member 38 and 40 are arranged in an opposing fashion as shown in FIG. 7, an axial opening 42 is defined between said arcuate members. Thus when this two-member bobbin type structure is inserted into a container with a spring member inserted into the axial opening between the said members, the spring member will mechanically bias the members (cathode or cathode collector) against the separator of the cell which in turn contacts the anode of the cell thereby maintaining good physical contact between these components. As stated above, this continuous mechanical biasing of the cathode or cathode collector against the separator which in turn contacts the anode will minimize internal cell resistance by maintaining a continuous physical contact between these components as the cell discharges.

Another embodiment of this invention is shown in FIG. 8 wherein cathode or cathode collector arcuate bodies 40 and 42 are arranged in an opposing fashion so as to define an axial opening 44. Disposed within opening 44 is a conductive coil member 46, said member 46 being in touching relationship with the inner surfaces of arcuate bodies 40 and 42. As is evident from this embodiment, the arcuate bodies 40, 42 could be compressed against coil member 46 and inserted into a partially assembled cell as shown in FIG. 1 whereupon the coil member 46 would mechanically bias the arcuate bodies 40, 42 outwardly against the separator 8 thereby exerting a force against anode 4 which in turn contacts the inner wall of the container 2. This arrangement will insure good physical and ionic contact between all of the members during discharge of the cell while the anode is being consumed.

Another embodiment of a cathode or cathode collector according to this invention is shown in FIG. 9. Specifically, the cathode or cathode collector 50 comprises a first arcuate member 52, a second arcuate member 54 and a third arcuate member 56, all of which have an arc measurement of about 120°. When the longitudinal flat end faces of the arcuate bodies 52, 54 and 56 are arranged in an opposing fashion as shown in FIG. 9, an axial opening 58 is defined between said members. Thus when the three arcuate members are inserted into a container with a spring member inserted into the axial opening 58, defined by said arcuate members, the spring member will mechanically bias the arcuate members against the separator of the cell which in turn contacts the anode of the cell thereby maintaining good physical and ionic contact between these components.

As shown in FIG. 10, a three-member bobbin type structure 60 (cathode or cathode collector), could be made with a cylindrical mesh spring 62 embedded longitudinally with bobbin type structure 60, so that the structure 60 could be compressed and then appropriately assembled within a cell as explained in conjunction with FIG. 8.

Another embodiment of a two-member bobbin type structure according to this invention is shown in FIG. 11. Specifically, arcuate members 70, 72 are molded with an elongated spring strip 74 embedded longitudinally within said arcuate members 70, 72. As seen from the drawing, strip 74 projects from the end face 76 of arcuate member 72. By bending or folding the arcuate members 70 and 72 about the strip segment 80 and bringing the longitudinal flat end faces of the arcuate members in opposing relationship, the bobbin type structure can be assembled into a container in a manner similar to that shown in FIG. 5. The projected segment 78 of strip 74 could then be secured to the cell's cover as described in conjunction with FIG. 5.

FIG. 12 shows a similar type bobbin construction as in FIG. 11 except that the elongated strip 90 does not protrude from the end faces 92 and 94 of arcuate members 96 and 98, respectively. In addition, the segment 100 of strip 94 between the arcuate members 96 and 98 is longer so that when the arcuate members 96 and 98 are folded to bring the longitudinal flat end faces of members 96 and 98 in opposing relationship, the segment 100 will form an inverted "U" shaped projection from the horizontally aligned end faces 102 and 104 of arcuate members 96 and 98, respectively. As shown in FIG. 13, the bobbin type structure 106 so formed from the arcuate members 96 and 98 of FIG. 12 can be inserted into a separator 108 within an anode-lined container 110 with the inverted "U" shaped projection 112 facing the open end of the container 110. The inverted "U" shaped projection 112 could be passed through an opening 114 in an insulating disc 116 and then secured to cover 118 by conventional means as by welding. An insulating gasket 120 is shown assembled with cover 118 in FIG. 13 so that when said cover-ring assembly is placed on top of container 110 after the electrolyte has been added, insulating gasket 120 will be interposed between cover 118 and container 110 whereupon conventional techniques, such as the radial-squeeze technique, can be used to seal the cell.

EXAMPLE 1

Several half cylindrical cathode collector members, as shown in FIG. 2, were made using acetylene black and Teflon (trademark for polytetrafluoroethylene) in the amounts shown in Table I.

TABLE I

| Mix Component | Weight or Volume | % by Wt. in Dry Mix |
|---|---|---|
| Mix A | | |
| Acetylene Black | 10.0 g | 75% |
| *"Teflon" Emulsion T-30B | 5.55 g | 25% (Teflon) |
| Ethyl Alcohol | 100 ml | — |
| Water | 420 ml | — |
| Mix B | | |
| Acetylene Black | 10.0 g | 90% |
| *"Teflon" Emulsion T-30B | 1.85 g | 10% (Teflon) |
| **"Tergitol" 15S9 | .45 g | — |

TABLE I-continued

| Mix Component | Weight or Volume | % by Wt. in Dry Mix |
|---|---|---|
| Water | 700 ml | — |

*Obtained commercially from DuPont which contains basically polytetrafluoroethylene.
**Obtained commercially from Union Carbide which contains mainly nonionic polyglycol ether.

The acetylene black of Mix A was wetted with the water alcohol solution and mixed until the acetylene black was completely wetted and dispersed. The Teflon emulsion was then added and thoroughly mixed with the solution after which the water contents of the slurry were reduced to less than 5%. The cake so formed was broken up into a powder form and then molded into a half cylindrical annular member. The member, while still retained in a carrier, was heated for 30 minutes at 370° C. Two such half cylindrical annular members were then assembled as shown in FIG. 2 to form an effective cathode collector type bobbin suitable for use in this invention.

For Mix B, the acetylene black was slowly added to a well stirred solution of water, Tergitol and Teflon emulsion until the acetylene black was thoroughly wetted and dispersed. The water in the slurry so formed was then substantially removed. The cake thus formed was then sintered in a controlled atmosphere at 370° C. for 30 minutes. The sintered cake was then broken up into fine particles of powder and molded into half cylindrical annular members. Two such half cylindrical annular members were then assembled as shown in FIG. 2 to form an effective cathode collector type bobbin suitable for use in this invention.

EXAMPLE 2

Using the procedure and composition of Mix A in Example 1 above, several arcuate members were molded, each of which had an arc measurement of about 150°. Two arcuate members so formed were assembled as shown in FIG. 7 to form a two-piece cathode collector suitable for use in this invention.

EXAMPLE 3

Several 0.65 inch (1.65 cm) diameter size cells were constructed similar to the cell construction shown in FIGS. 1 to 6. The cathode collector for each cell was made using the procedure and composition of Mix A so that in the final dry state, the effective bobbin formed by two half cylindrical annular members contained 75 weight percent acetylene black and 25 weight percent polytetrafluoroethylene. Each half cylindrical annular member was 1.55 inches (3.9 cm) high, had a wall thickness of 0.24 inch (0.6 cm) and an outside diameter of 0.58 inch (1.5 cm).

Each cell was assembled by placing a Teflon insulating disc into the bottom of a 304 stainless steel container followed by inserting a 0.08 inch (0.2 cm) thick lithium sheet, 1.5 inches (3.8 cm) high, against the internal wall of the container followed by a tubular glass separator as specified in Table II measuring 2.0 inches (5.08 cm) high. The two-piece cathode collector was then axially inserted into the container and then a spring member was compressed and inserted into the axial opening defined by the cathode collector arcuate members. Upon release of the compressive force on the spring member, the cathode collector was biased radially outward thereby imparting a continuous physical contact to the separator which in turn contacted the anode of the cell. An extended leg of the spring member was projected through an opening in an insulating disc and a Teflon gasket and then welded to a stainless steel cover as described in conjunction with FIG. 5. Before sealing the cover to the can, an electrolyte as specified in Table II was fed into each cell. Each cell was then sealed in a conventional manner.

The cells were then discharged across a load to a 2.5-volt cutoff and the data obtained from the tests are shown in Tables II and III.

TABLE II

| Cell Sample | Separator Used | Cathode Solution | Volume of Cathode Solution Added (CC's) | Open Circuit Voltage (volt) | Initial Impedance (ohm) | Post Discharge Impedance (ohm) |
|---|---|---|---|---|---|---|
| 1 | Nonwoven Glass | 1.0M LiAlCl$_4$ in SO$_2$Cl$_2$ | 5.65 | 3.93 | 4.48 | 1.15 |
| 2 | " | " | 5.50 | 3.93 | 6.22 | 2.01 |
| 3 | " | " | 5.94 | 3.93 | 4.85 | 1.21 |
| 4 | " | " | 5.94 | 3.93 | 4.79 | 3.03 |
| 5 | " | " | 6.09 | 3.93 | 5.08 | 0.77 |

TABLE III

| CELL SAMPLE | DISCHARGE LOAD (ohm) | AVERAGE VOLTAGE (volt) | DISCHARGE CAPACITY (Ampere Hours) | VOLUMETRIC Energy Density Watt-hrs. In$^3$ | Watt hrs cm$^3$ | Li EFFICIENCY*% |
|---|---|---|---|---|---|---|
| 1 | 10 | 2.95 | 1.06 | 4.95 | 81.11 | 25.3% |
| 2 | 15 | 2.95 | 2.52 | 11.81 | 193.53 | 61.5% |
| 3 | 20 | 3.00 | 2.80 | 13.34 | 218.60 | 76.8% |
| 4 | 44 | 3.19 | 3.19 | 16.34 | 267.76 | 78.8% |
| 5 | 176 | 3.06 | 3.06 | 16.82 | 275.63 | 84.2% |

*Lithium Efficiency = $\dfrac{\text{Cell ampere hour output}}{\text{Ampere hour imput of lithium}}$ As evidenced by the test data, using a carbonaceous current collector in the form of two half cylindrical bodies will produce an effective and efficient type bobbin for use in liquid cathode cell systems.

What is claimed is:

1. An electrochemical cell comprising a container; an anode disposed within said container; a porous separator disposed within and in surface contact with said anode; a cathode collector in the form of at least two arcuate bodies disposed within said separator; means for biasing said arcuate bodies radially outward against said separator which in turn contacts the anode; and a liquid, active reducible cathode-electrolyte disposed within said container.

2. The cell of claim 1 wherein the cathode collector is in the form of two arc segments each ranging from about 140° to 180°.

3. The cell of claim 1 wherin the cathode collector is in the form of three arc segments, each ranging from about 90° to 120°.

4. The cell of claim 1 wherein the means for biasing the arcuate bodies of the cathode collector radially outward is a substantially "U" shaped spring member in contact with and disposed axially within an opening defined by said arcuate bodies.

5. The cell of claim 1 wherein the means for biasing the arcuate bodies of the cathode collector radially outward is a generally cylindrical spring member in contact with and disposed axially within an opening defined by said arcuate bodies.

6. The cell of claim 1 wherein the means for biasing the arcuate bodies of the cathode collector radially outward is an elongated spring strip embedded longitudinally in the arcuate bodies such that when the arcuate bodies are arranged in an opposing fashion to form a cylinder type configuration, the strip extending between the end faces of adjacent arcuate bodies will be bent into a "U" shaped configuration.

7. The cell of claim 1 wherein the means for biasing the arcuate bodies of the cathode collector radially outward is a cylindrical spring in which a longitudinal portion of said spring is embedded longitudinally within each of the arcuate bodies thereby forming an overall substantially cylindrical configuration.

8. The cell of claim 4 wherein said substantially "U" shaped spring member is a conductive member and wherein at least one of the legs of said substantially "U" shaped spring member is secured to the positive terminal of the cell.

9. The cell of claim 5 wherein said spring member is conductive and wherein a conductive tab is secured at one end of said spring and the other end of the tab is secured to the positive terminal of the cell.

10. The cell of claim 6 wherein said elongated spring strip is a conductive strip and wherein at least one end of the elongated spring strip extends beyond the end face of one of the arcuate bodies and is secured to the positive terminal of the cell.

* * * * *